Figure 1:
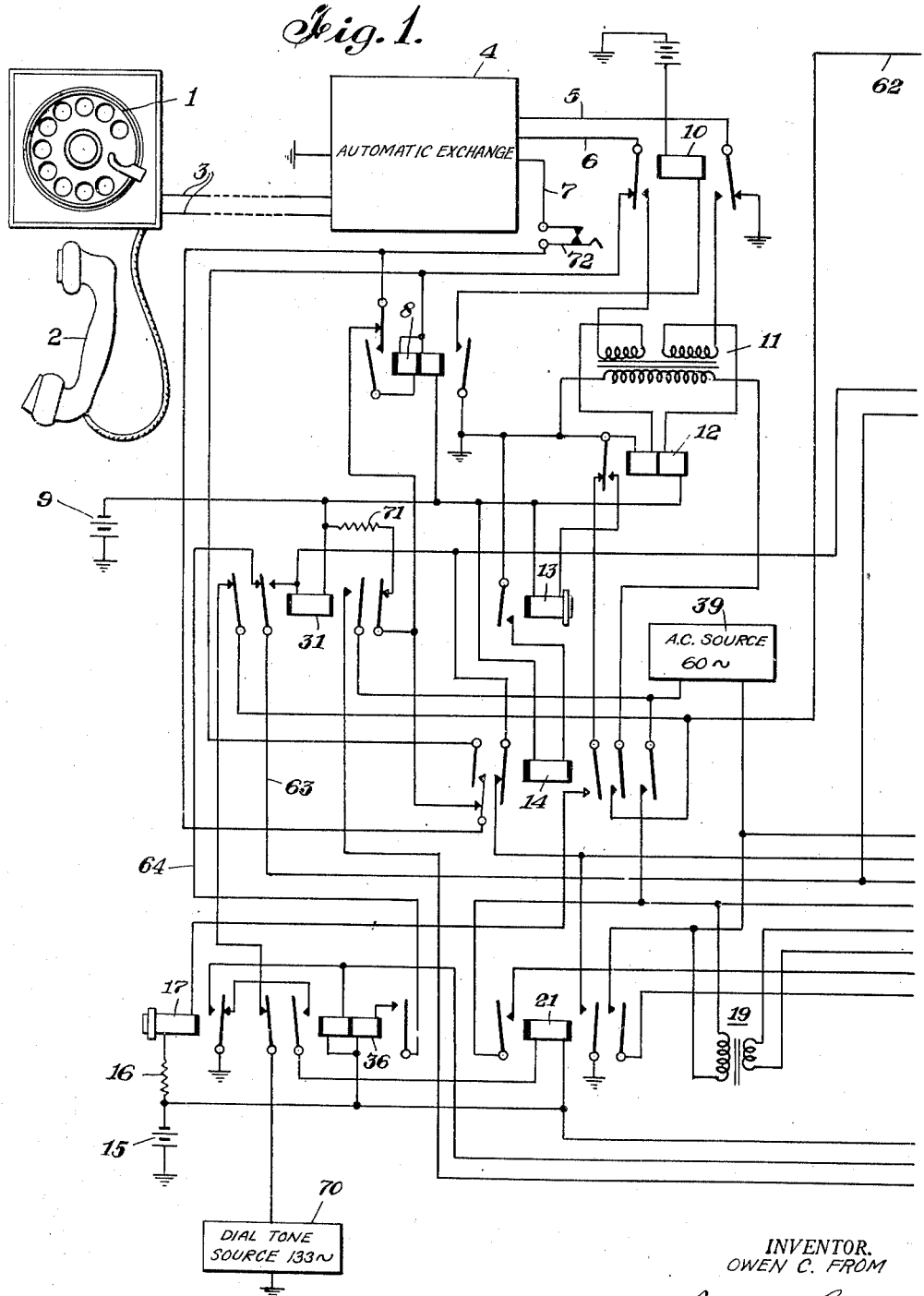

Nov. 29, 1949     O. C. FROM     2,489,282
APPARATUS FOR TESTING THE SPEED OF CALLING DIALS
Filed Aug. 19, 1947     3 Sheets-Sheet 3

INVENTOR.
OWEN C. FROM

BY *Percy P. Lautzy*

ATTORNEY

Patented Nov. 29, 1949

2,489,282

UNITED STATES PATENT OFFICE 2,489,282

APPARATUS FOR TESTING THE SPEED OF CALLING DIALS

Owen C. From, East Orange, N. J., assignor to Federal Telephone and Radio Corporation, New York, N. Y., a corporation of Delaware Application August 19, 1947, Serial No. 769,341

8 Claims. (Cl. 179—175.24)

This invention relates to telephone apparatus and more particularly to equipment which is suitable for testing the speed of a calling dial.

In carrying out my invention I have provided means for extending the subscriber's line to test equipment at the central station so as to test the subscriber's dial speed by remote control from the subscriber's station. I also provide means for causing the test equipment to deliver an answer-back signal in response to the performance of its function in rating the speed of the dial under test. This answer-back signal is constituted as one or more pulses of a discriminating tone, which are automatically sent over the subscriber's line and can be heard on the phone at the subscriber's station.

In my co-pending application, Serial Number 556,400, filed September 29, 1944, I have disclosed a portable system for testing telephone dials capable of making a visible indication in accordance with the operation of the subset being tested. By the present invention, the test circuit is permanently located at the exchange and an audible answer-back signal is transmitted back to the subscriber's station to indicate in response to a dial speed test call, the speed of the calling dial, that is, whether it is too fast, too slow or within a satisfactory speed range.

An object of my invention, therefore, is to provide test equipment for checking the speed of a dial which is installed in a remote subscriber's station.

Another object is to provide test equipment which will automatically send back signal pulses from the central station to a subscriber's station to indicate to a maintenance man the speed of the dial which he is testing.

Still another object is to provide a combination of relays which may be associated with a subscriber's line by the usual dialing process and which may be used to control the operation of a timing device for testing the dial speed, or number of pulses per second in a pulse train. This may be carried further by so adapting the invention that after the test equipment is connected to the subscriber's line it may be held indefinitely for repeated tests of the dial.

An important feature of my invention lies in the use of photoelectric tubes for producing a selected response to the orientation of a light beam after the latter has been rotated into a certain position. This position is determined by a time interval measurement in respect to a train of pulses, such as are produced by the dialing of the digit "0" by the telephone dial to be tested.

The particular response which is made by a selected photoelectric cell is arranged to set up a condition in a group of relays designed to store information and to translate the same into code signals consisting of one or more pulses of some discriminating tone.

Another feature of my invention is that after the maintenance man once receives the audible indication of dial speed, he may make the necessary adjustments without losing the connection which he has obtained between the subscriber's station and the test unit. This enables the maintenance man to make adjustments and repeat dial speed tests until the test results are satisfactory.

Figure 2:
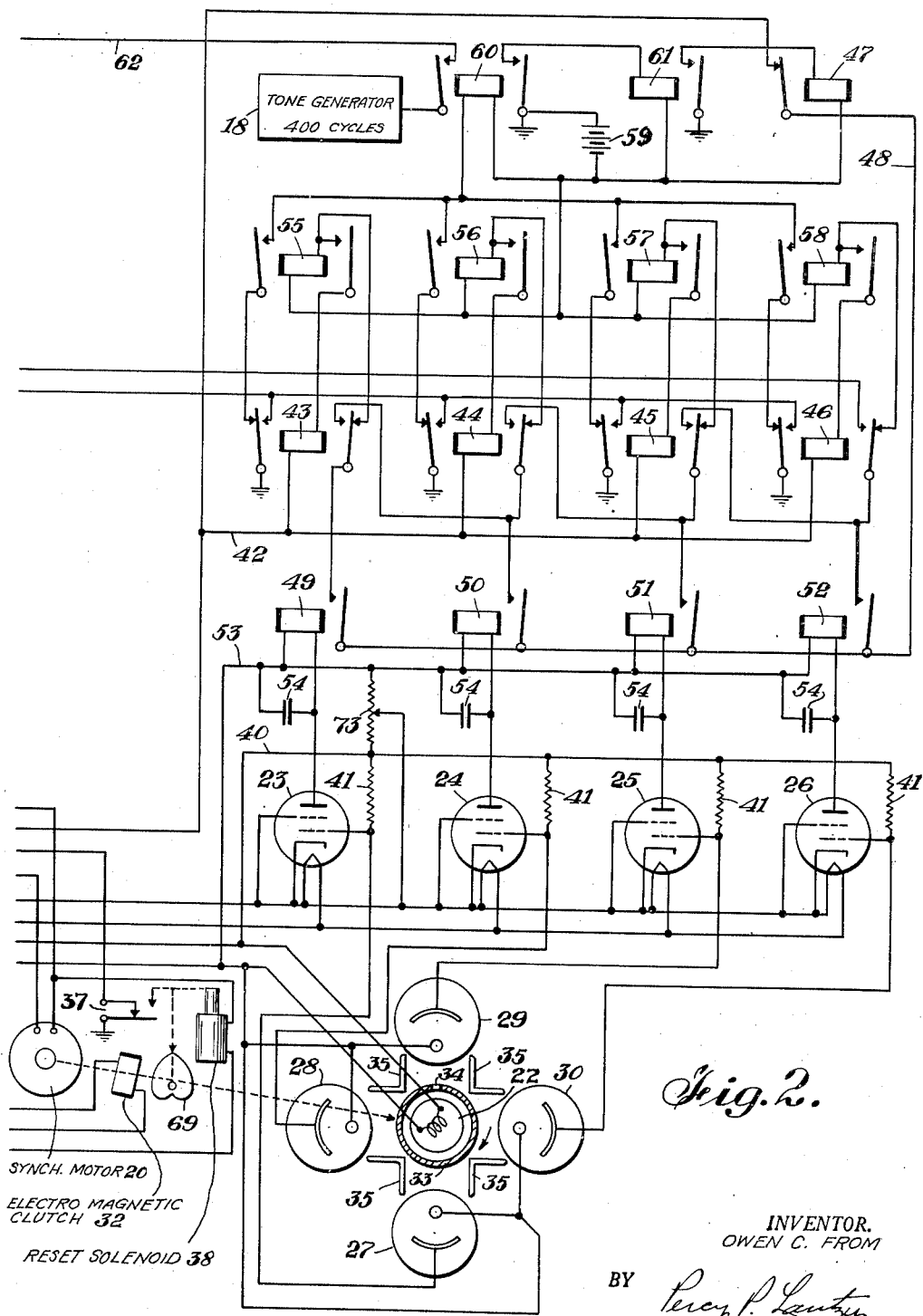
Figure 3:
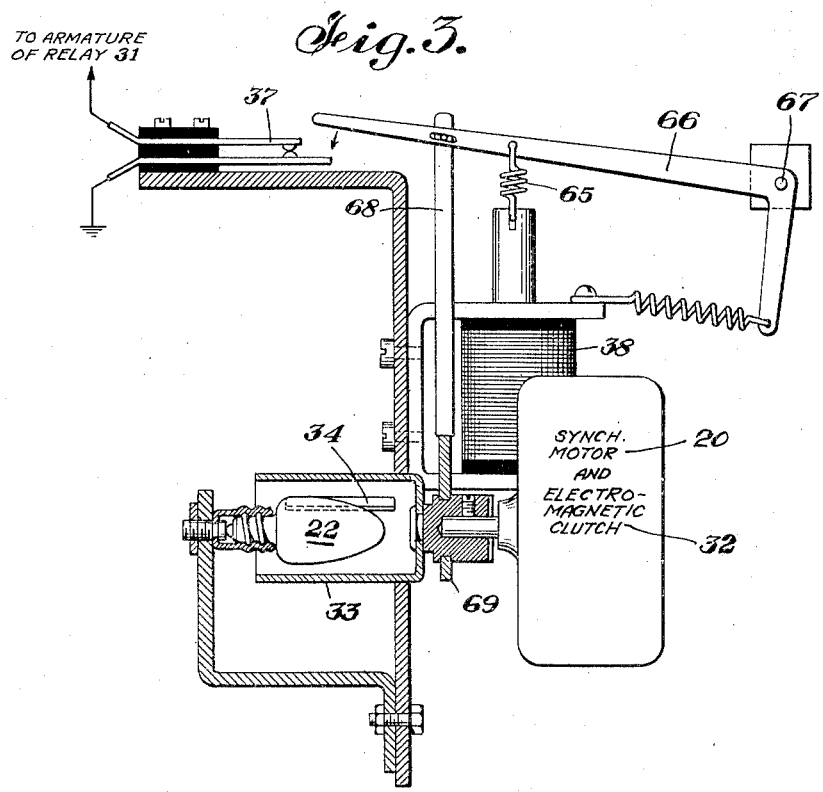

My invention will now be described in more detail, reference being made to the accompanying drawings, wherein:

Figure 1 and Figure 2 when placed side by side for joining their common conductors show a complete circuit diagram of all the essential components which are incorporated within the test unit. Fig. 1 of this diagram also shows connections from an automatic exchange to a dial to be tested and to a telephone hand set which may comprise a subscriber's station to be tested; and Figure 3 shows in vertical section certain details of structure which include in addition to other components a lamp surrounded by a rotary shield adapted to be driven by a synchronous motor.

The conditioning circuits and relays

In Fig. 1 I show a telephone dial 1 and a telephone hand set 2 which may constitute the equipment at a subscriber's station where the dial is to be tested. The line 3 from the subscriber's station leads to an automatic exchange 4 which in the present illustrated embodiment is of the "Rotary" type, the details of which are not herein shown because they are well knwon in the art. The various selectors in the automatic exchange are, of course, arranged to seize the test equipment by dialing a certain number. When this is done the two conductors 3 of the subscriber's line are connected respectively to conductors 5 and 6 in the trunk line of the test equipment. The trunk line also includes a guard conductor 7 the uses of which are conventional in various well known types of automatic switching equipment. This can be modified to suit any type of equipment. The maximum trunk loop resistance across conductors 5 and 6 is about 1400 ohms, thus permitting the operation of relay 12 in response to dial pulses over the subscriber's line.

In establishing the connection to the test equipment the circuit for relay 8 is closed from battery 9 through the right hand winding of the relay, through a back contact of relay 10 to conductor 6, back to the controlling circuit in the "Rotary" type of switching equipment to cause the line 3 to be extended metalically through to the test equipment. In "Step-by-step" and other types of equipment the function of relay 8 may be performed by the regular exchange switching mechanism and in such equipment the relay 8 may then be omitted.

The right hand winding of relay 8 has a relatively low resistance, 700 ohms for example, while its left hand winding, which is used for holding purposes has a relatively high resistance, 4,000 ohms for example. The right hand contacts of relay 8, when closed by its operation, complete a circuit for relay 10. The three left hand contacts of relay 8 are in a make-before-break arrangement so that a holding circuit may be established from battery 9 through both of its windings and its left hand front contact to ground on the busy conductor 7 of the trunk line. When relay 10 operates it connects the line conductors 5 and 6 to windings on the line side of a transformer 11, and thence to the two windings of relay 12. One of these windings is grounded; the other is connected to battery 9. The connections through windings of the transformer 11 are for the purpose of transmitting a dial tone and an answer-back signal, as will be explained later. Relay 10 upon operation opens its right hand contact thereby removing the energizing ground from relay 8, but, because of the closure of its left hand contacts, it is held energized through conductor 7 which is grounded by the group selector of the exchange 4.

Relay 12 now operates and remains energized until the maintenance man rotates the dial for testing purposes. Relay 12 will then release during each break between dial pulses. Prior to reception of the dial pulses, the operation of relay 12 supplies ground to a slow release relay 13. This relay upon energization holds up throughout an impulse train produced by the dial and is only released after a more prolonged time lapse between successive dialing operations.

Relay 13 upon operation closes an operating circuit for relay 14. This relay performs a number of functions as follows: its left hand contact group of the make-before-break type short circuits the high resistance winding of relay 8, but without releasing the latter because relay 8 remains locked through its low resistance winding now connected to the busy conductor 7 and to ground in the selector of the automatic exchange.

Relay 14 closes three circuits through its respective right hand contacts as follows: the contact pair nearest the relay prepares a connection from battery 15 through a resistor 16 and the winding of relay 17 to the back contact of relay 12 and thence to ground. This circuit, however, is not completed until relay 12 next releases, which is at the outset of the dial pulse train. The contact pair second to the right from the winding of relay 14 prepares a connection from a tone generator 18 to the winding on the local side of transformer 11, whereby an informative signal is to be sent back to the subscriber's station to indicate the speed range of the dial being tested. The third contact pair to the right on relay 14 connects an alternating current source to a filament transformer 19 and to a synchronous motor 20 which is a component of the timer. This third contact pair also prepares a circuit which is eventually closed by the left hand contact pair of relay 21 which circuit will presently be shown to light up a lamp 22 in the timer and also to supply plate potential to a selected one of four thyratron tubes, 23, 24, 25 and 26 which are used as amplifiers and which operate under control of photoelectric tubes 27, 28, 29 and 30.

One more function performed by relay 14 is to open a ground circuit to relay 31, thus preventing its operation until the completion of the test operations. This relay serves to restore normal conditions to the various components of the test unit. It cannot operate prior to the first operation of relay 14 because the ground potential is supplied by the operation of relay 21 subsequent to the operation of relay 14.

*Timing*

Since it will be the practice of the maintenance man to dial the digit "0" for test purposes, the duration of time for the dial to rotate back to normal is that which is to be measured in all cases. This time interval is substantially commensurate with the energization of relay 17 which is a slow release relay. The holding time of relay 17 is dependent upon the dial pulse train duration because it will not release during the short spacing intervals between the dial pulses. It will, however, release when the pulsing of relay 12 ceases for a longer period, that is, at the termination of the dial pulse train.

The primary function of relay 17 is to control the operation of an electromagnetic clutch 32 which is one of the components of the timer. This clutch couples the shaft of synchronous motor 20 to the shaft on which a rotary masking cylinder 33 is mounted. This cylinder is opaque, except for a slot 34 which allows a beam of light to be projected in different directions around the lamp 22 as shown in Fig. 2. The space surrounding the slotted cylindrical mask 33 is divided into 90° zones by means of angular partition members 35 so that sharp differentiation may be obtained between the responses of the photoelectric tubes which occupy quadrature positions about the lamp 22.

The electromagnetic clutch 32 holds for substantially the same period of time as the holding time of relay 17. Relay 36 is energized by relay 17 through a circuit which parallels that of the electromagnetic clutch winding. Operation of relay 36 serves to prepare for the energization of relay 21 immediately upon the release of relay 17. Relay 36 has a locking winding, the circuit of which extends from battery 15 through its locking contacts, through a back contact of relay 31 and thence to a mechanically controlled circuit breaker 37 to ground. The means for mechanically opening these contacts will presently be explained in connection with the operation of a solenoid 38 which is used for restoring the cylindrical mask 33 to its starting position.

Relay 21 is energized as stated above upon the release of relay 17. Its circuit may be traced from battery 15 through closed contacts of relay 36 and the back contact of relay 17 to ground. The operation of relay 21 performs several functions as follows: its left hand contact pair closes an alternating current circuit from source 39 to the lamp 22 and to a common conductor 40 leading through individual resistors 41 to the control grids of the four thyratron tubes 23, 24, 25 and 26. These grids are also connected individually to the cathodes of the four photoelectric tubes 27, 28, 29 and 30.

The first contact pair to the right of relay 21 when closed places ground potential on common conductor 42 which is branched to individual windings of four relays 43, 44, 45 and 46 in a counting chain group. A circuit is also closed by this contact pair to the back contact of relay 47 and thence to a common conductor 48 which feeds ground potential to the movable contacts of relays 49, 50, 51 and 52.

During the train of ten dial pulses the clutch magnet 32 of the timer is energized and the masking cylinder 33 rotates about the lamp 22. At the end of the train of pulses, relay 17 releases and removes the energizing ground from the clutch magnet while simultaneously energizing relay 21. When the clutch magnet releases, the masking cylinder 33 stops rotating and the point at which its slot 34 comes to rest in front of one of the four quadrants of the photoelectric assembly determines which one of the photoelectric tubes is to be excited. It is apparent too, that the synchronous motor 20 serves to rotate the masking cylinder at constant speed so that the arc through which it rotates is an inverse function of the dialing speed.

The slotted opening 34 in the masking cylinder allows light to be projected upon one of the photoelectric tubes 27, 28, 29 or 30. The lamp 22, however, is not lit until the masking cylinder 33 comes to rest, as will be observed by the fact that the lamp circuit is closed by the operation of relay 21.

*Interpretation of the timing operation*

Each of the cathodes of the photoelectric tubes is connected directly to a control grid in an associated thyratron tube. These cathodes, as previously stated, are also connected through resistors 41 to the left hand terminal of the A.-C. source 39. The anodes of each of the photoelectric tubes are all connected to the right hand terminal of the A.-C. source 39 through a right hand contact pair of relay 21. The same terminal of this source is also connected through the furthermost right hand contact pair of relay 21 to a conductor 53 which leads through the windings of relays 49, 50, 51 and 52 (in parallel) and thence individually to the anodes in the thyratron tubes 23, 24, 25 and 26. During half-cycles of the alternating current the plate circuits of the thyratrons and the photoelectric tubes will be positive and the photoelectric tube current in the tube which is excited by the directed light beam will trigger the associated thyratron tube by raising its grid potential to a more positive value than normal. When the thyratron tube ignites, its anode current will be drawn through the winding of the associated relay in the group 49, 50, 51 and 52 and cause the selected one to be energized. Since the anode current is repeatedly cut off by the 60-cycle source, it is necessary that means be provided for holding the actuated relay energized. Accordingly, a capacitor 54 is placed in shunt with the winding of each relay 49, 50, 51 and 52. This has the effect of smoothing out the operating current.

From the foregoing, it will be seen that the thyratron tubes act as amplifiers in respect to the photoelectric tubes.

Take relay 49, for example. It initiates complete operation of a counting circuit which is composed of paired relays 55, 56, 57 and 58 in one series and relays 43, 44, 45 and 46 in a second series. These relays of the counting chain are connected up in a well-known manner so that whichever pair is first energized, it will cause successive energization of other pairs, if any, to the right of the chain. Thus, the operation of relay 49 closes an operating circuit to relay 55 which may be traced from the ground contact on relay 21 through contacts of relay 47, conductor 48, contacts of relays 49 and 43, the coil of relay 55 and thence to battery 59. Upon subsequent operations of relays 60, 61 and 47 this circuit is opened by relay 47, at which time relay 55 is locked up in series with relay 43. Relay 43 upon operation causes relay 56 to operate. This relay is subsequently locked up through relay 44 which further controls the operation of relay 57 and so on until finally relays 58 and 46 are locked up in series.

If the speed of the dial is such that the slot 34 in the cylindrical shield 33 is stopped in front of photoelectric tube 28, then a response is made in the associated thyratron tube 24 and relay 50 is energized. This relay supplies ground potential to relay 56 which, upon closing its contacts, impresses ground potential on relay 60 and operates the same. This relay upon operation closes a circuit to relay 61 and this again closes a circuit to relay 47, the contacts of which will then be opened for the purpose of removing ground potential from relay 56 on the side of its right hand contacts. However, this relay now has a holding circuit through relay 44 so that these relays are locked up. Relay 44 transfers connection of the grounded conductor 48 to relay 57. This relay again operates relay 60 to start another succession of operations of relays 61 and 47. This sequence of operations is again repeated so that relays 57 and 45 and energized in series and relay 45 upon energization transfers connection of the grounded conductor 48 to relay 58.

Then again relay 58 operates relay 60, which, as before, operates relays 61 and 47. Each time these relays are operated in succession, relay 60 closes a circuit from the 400 cycle source 18 through conductor 62 and contacts of relay 14 to the local winding in transformer 11. Thus a succession of pulses is sent out over the line 3 to the subscriber's station where the dial 1 is being tested.

*Interpretation of answer-back tone pulses*

A range of speeds is indicated by each of the signals which consist of from one to four pulses, depending upon which photoelectric tube has been activated. The test equipment is designed to test dial speeds from 7 to 24 pulses per second. Usually the dial speed is set for a normal rate of 10 pulses per second. However, in certain installation of automatic telephone equipment, dial speeds as fast as 20 pulses per second are sometimes rated as normal. In testing a dial, the normal speed of which would be 10 pulses per second, the correct speed would be indicated by a test which resulted in the rotation of the slotted shield 33 through one full revolution, in which case photoelectric tube 29 would be activated. This tube would also be activated for speeds between 9 and 11 pulses per second. The counting relay chain would start operation with the energization of relay 57 and would cause two pulses to be derived from the tone generator 19 for transmission of the answer-back signal. A slow dial which would give only from 7 to 9 pulses per second would, of course, take longer for its 10 pulses to be delivered. In this case, the slotted shield 33 would average to revolve 1¼ revolutions and would stop opposite photoelectric tube 30. The speed of 7 to 9 pulses per second would then be indicated by an answer-back signal having only one tone pulse.

A dial speed of from 11 to 16 pulses per second is obviously too fast if the normal dial speed should be 10 pulses per second, and it is too slow if the normal dial speed should be 20 pulses per second. For either speed the ten pulses produced by dialing "0" would be received by the test equipment while the slotted shield 33 rotated about ¾ of one revolution. The shields 33 then stops so that the photoelectric tube 28 responds to the light beam, and the result is to compose an answer-back signal having three tone pulses.

Where the normal dial speed is 20 pulses per second, the correctness of this setting would be indicated by a response in photoelectric tube number 27. This tube is the one directly opposed to the starting position of the slotted shield member, so that in this case the ten pulses of dialing "0" would be received while the slotted shield 33 rotates through ½ a revolution.

Repetition of the test

Following the transmission of the answer-back signal, certain relays automatically operate and release in this manner: When relay 47 operates it removes ground potential from conductor 48 and so causes relay 46 to operate in series with relay 58. This releases relay 60, then relay 61, then relay 47. When relay 47 releases ground, potential from closed contacts of relay 21 is again applied to conductor 48 and thence through contacts of any operated relay in the group 49, 50, 51 and 52, and thence to the right front contact of relay 46 and to relay 31 for operating the same. Relay 31 upon operation locks up through conductor 63 and circuit breaker 37. Its contact at which conductor 64 terminates removes ground from relay 36 and unlocks the same. Relay 31 closes an A.-C. circuit for operating the solenoid 38, thereby to reset the slotted shield 33. At the end of the solenoid operation the circuit-breaker contacts 37 are mechanically opened, causing relay 31 to release.

The release of relay 36 causes relay 21 to release, and as a result ground potential is removed from all relays of the counting chain group, so as to restore the same. Relays 12, 13 and 14 remain operated, and are restored only by replacing the handset 2 in its cradle at the subscriber's station, in which case the test equipment becomes disconnected from the automatic exchange.

After relays 36 and 21 have been restored, a 133-cycle dial tone source 70 is again connected to the primary winding of transformer 11. This informs the maintenance man that he may again test his dial. The same performance may then be repeated as before. Each time he makes a dial speed test he dials "0" in order to obtain ten pulses to be timed. He does this without the necessity for operating the switchhook, or for replacing the handset in its cradle, and thereby saves the time that would be necessary for re-establishing the connection through the automatic exchange to the test equipment.

Opening the subscriber's loop

If the maintenance man has finished his work, he replaces the handset 2 in its cradle and causes disconnection of the trunk conductors 5 and 6. Relay 12 then releases and causes the release of relays 13 and 14. Relay 14 now completes a circuit for operating relay 31, provided that it had not been previously operated through the operation of relay 46, as hereinabove explained. A back contact of relay 14 feeds ground potential to relay 31 in case relay 21 remains operated and the answer-back signal was not carried through to completion.

In any event relay 31 upon operating receives a locking ground from the mechanically actuated circuit breaker 37. Relay 31 upon actuation removes the locking ground from relay 36 and energizes the reset solenoid 38 from the 60 cycle A.-C. source 39. The core of this solenoid is attached by a spring 65 (Fig. 3) to a lever arm 66 pivoted at 67. This solenoid has two functions. One is to restore the cylindrical shield cylinder 33 to its starting position. The other is to open the circuit breaker 37. The first function of restoring the shield cylinder is performed by depressing a plunger 68 against the periphery of a heart shaped cam 69. The shortest peripheral radius of this cam is the one at which the cam will come to rest. In this position the slot 34 in the cylindrical shield faces photoelectric tube 29 (Fig. 2).

When relay 31 is energized it unlocks relay 36 and this in turn releases relay 21. Relay 21 upon releasing restores all the associated relays. Also the alternating current power source is removed from the photoelectric tubes and the thyratrons.

The second function of the solenoid, as abovementioned, is performed by causing the end of the lever arm 66 to be brought down against one of the contacts of the circuit breaker 37 and thus to break the locking circuit at that point so that relay 31 de-energizes.

Upon completion of all tests, the test equipment is disconnected from the subscriber's loop, as before stated, by replacing the handset in its cradle. This, of course, disconnects one of the selector switches of the automatic exchange and removes the holding ground through the "busy" line 7 which, up to that time, had held relay 8 locked up.

It will be noted that relay 14 upon release opens one side of the A.-C. line so that the power transformer 19 is de-energized. The low resistance winding of relay 8 is disconnected from "busy" conductor 7 by the release of relay 14, thus causing the special service selector in the automatic exchange to advance and open this circuit. Relay 8 releases and causes the release of relay 10. Relay 8 upon releasing restores the test potential through resistor 71 to the "busy" conductor 7 of the trunk line. Relay 10 now supplies ground to conductor 5 of the line. The circuit is then completely restored to normal.

In the foregoing description of my invention I have not considered it necessary to explain certain features of the automatic exchange which would be made cooperative with the test equipment for purposes of establishing connections between the subscriber's station and the test equipment which will vary depending upon the type of system employed. Such features are well understood by those skilled in the art and are not pertinent to my invention. It may be said, however, that in order to permit maintenance work on the automatic dial test equipment or to make this circuit "busy" for any reason, a "busy" key 72 may be provided in the line 7 so as to prevent the seizure of the test equipment when it is not available for service. When the key 72 is opened, it removes the test potential from conductor 7 and makes this circuit "busy" with respect to any incoming calls for special service.

While I have described my invention as it has been developed for certain practical uses and this description is specific to one particular embodiment, it will be understood that variations may be made in the circuit arrangements and in the details of structure without departing from the spirit and scope of the invention itself.

I claim:

1. A time interval measuring device comprising a lamp, a rotatable shield having therein a slit for controlling the direction of an emitted light beam, an array of photoelectric devices disposed circumferentially of said shield for excitation in a successive manner by said beam as said shield rotates, a constant speed motor for driving said shield, a signal-controlled clutch for engaging and disengaging said shield with respect to the drive shaft of said motor, means operable after disengaging said clutch for lighting said lamp and for causing the beam therefrom to produce a response in a selected one of said photoelectric devices, and keying means subject to control by a responding photoelectric device and arranged to compose a signal which is informative as to the duration of the measured time interval.

2. A device according to claim 1 wherein said keying means includes a counting relay chain operable to produce from one to four signal pulses, depending upon the particular photoelectric device which assumes control.

3. A system for testing a telephone dial located in a subscriber's station by means of testing equipment located in a central office, said system including means for seizing and holding a line connection between the subscriber's station and said equipment while dialing operations are performed, a relay system including a slow release relay arranged and adapted to be energized at the first circuit break of a dial pulse train and to hold for substantially the duration of said dial pulse train, a circular array of photoelectric devices, a lamp concentrically disposed with respect to said array, a slotted shield member surrounding said lamp and mounted for rotation so as to direct a light beam through its slot and onto a selected one of said photoelectric devices, a constant speed motor and an electromagnetic clutch for rotating said shield member intermittently, said clutch being subject to engagement concurrently with the holding time of said slow-release relay, means including a solenoid and a shaped cam for resetting said shield member to a predetermined starting position, relay storage means selectively activated by and in accordance with an activation of one of said photoelectric devices by light from said lamp after said shield member has been rotated through a certain arc which is determined by the holding time of said clutch, and an answer-back system operable by the selected photoelectric device, said answer-back system comprising relay means for determining a number of pulses to be included in a signal pulse train, and means for transmitting said signal pulse train back to said subscriber's station, thereby to give information as to the speed of the dial under test.

4. A system according to claim 1, wherein the relay means of said answer-back system includes a counting relay chain and connections from respective ones of said photoelectric devices to intermediate points on the circuits of said chain.

5. A system according to claim 1 further including relay means for so holding the established connections between said subscriber's station and said testing equipment that repeated timing tests of the dial may be made without repeating the dialing of the call number of the test equipment line.

6. A system for testing a telephone dial located in a subscriber's station by means of testing equipment located in a central office, said system including means responsive to a given dial signal for seizing and holding a line connection between the subscriber's station and said equipment while dialing tests are performed, holding means adapted to be energized at the first circuit break of a dial pulse train and to hold for substantially the duration of said dial pulse train, a plurality of photoelectric devices, a lamp concentrically disposed with respect to said array, an apertured shield mounted for rotation so as to direct a light beam from said lamp successively onto said photoelectric devices, a constant speed drive and a clutch for rotating said shield, said clutch being subject to engagement concurrently with the holding time of said holding means, means for resetting said shield to a predetermined starting position, storage means selectively activated by and in accordance with an activated photoelectric device after said shield member has been rotated through an arc determined by the holding time of said clutch means, and an answer-back system operable by the selected photoelectric device to transmit a signal back to said subscriber's station, thereby to give information as to the speed of the dial under test.

7. In a system for timing the pulse rate of a telephone dial when connected by line at a subscriber's station to a central office, testing means at said office responsive to dial pulses transmitted through said line for classifying the pulse rate thereof as fast, normal or slow, said testing means including a lamp, an apertured shield to control emission of light from said lamp in the form of a beam, a plurality of photoelectric elements, and means controlled by a train of dial pulses to control the shield and lamp arrangement successively to direct the beam forming means thereof toward said photoelectric elements, each of said elements being adapted to initiate a particular dial speed signal, and means for transmitting the resulting signal to said subscriber's station.

8. In testing apparatus, a device having a start-stop operating characteristic wherein the elapsed time between its starting and stopping may deviate from a given time standard, a lamp, an apertured shield to control emission of light from said lamp in the form of a beam, a plurality of photoelectric elements disposed for selective control by a light beam from said lamp, a constant speed drive, an electromagnetically operated clutch for effecting mechanical coupling between said drive and said shield to rotate said shield, means controlled by a train of signals from said mechanism for engaging and releasing said clutch at the beginning and end of said train, means operative after the release of said clutch for causing said lamp to be lighted, and means to produce a signal, the characteristic of which is determined in accordance with the selective excitation of one of said photoelectric elements, said last-named means including a chain of counting relays, the operation of which is subject to control by different ones of said photoelectric elements, said relays being effective in causing a signal to be composed which has a different number of pulses depending upon the particular photoelectric element which is selected.

OWEN C. FROM.

REFERENCES CITED

The following references are of record in the file of this patent:

UNITED STATES PATENTS

| Number | Name | Date |
|---|---|---|
| 2,182,000 | Nichols | Dec. 5, 1939 |
| 2,230,435 | Potts | Feb. 4, 1941 |
| 2,416,102 | Kessler | Feb. 18, 1947 |